United States Patent
Hofmann et al.

(10) Patent No.: US 7,096,297 B2
(45) Date of Patent: Aug. 22, 2006

(54) SYSTEM AND METHOD FOR DELAYING AN INTERRUPT REQUEST UNTIL CORRESPONDING DATA IS PROVIDED TO A DESTINATION DEVICE

(75) Inventors: Richard Gerard Hofmann, Cary, NC (US); Jason Michael Hopp, Apex, NC (US); Dennis Charles Wilkerson, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 10/804,873

(22) Filed: Mar. 19, 2004

(65) Prior Publication Data
US 2005/0210174 A1 Sep. 22, 2005

(51) Int. Cl.
*G06F 13/24* (2006.01)
*G06F 9/46* (2006.01)

(52) U.S. Cl. .................... 710/263; 710/268
(58) Field of Classification Search ............. 710/263, 710/264, 266, 268, 310, 52, 33, 28, 306, 710/311; 709/200, 253; 370/464, 912; 340/286.01; 712/42; 711/100, 200
See application file for complete search history.

(56) References Cited

U.S. PATENT DOCUMENTS 3,766,526 A * 10/1973 Buchanan .................... 710/51
5,278,968 A * 1/1994 Koumoto .................... 712/42
5,701,516 A * 12/1997 Cheng et al. ................ 710/22
6,185,629 B1 * 2/2001 Simpson et al. ............. 710/10
6,457,073 B1 * 9/2002 Barry et al. ................. 710/22
6,981,073 B1 * 12/2005 Wang et al. ................. 710/28

OTHER PUBLICATIONS

"PRESTOR-1 A Processor Extending Multithreaded Architecture" by Tanaka, K. (abstract only)☐☐Publication Date: Jan. 17-19, 2005.*

* cited by examiner

*Primary Examiner*—Gopal C. Ray
(74) *Attorney, Agent, or Firm*—VanLeeuwen & VanLeeuwen; Joscelyn G. Cockburn (57) ABSTRACT

A method and system for forwarding interrupt requests from a source device to a destination device. A controller bridge receives data, from a source device, for a destination device and stores the incoming data in a data queue. An interrupt request is received from the source device for the destination device and forwarded to the destination device in response to completing a transfer of the data from the source device to the destination device. If data received from the source device for the destination device are pending in the data queue, the interrupt request is rejected and the source may resubmit the interrupt request at a later time. If additional data are received from the source device for the destination device, the data may be rejected in response to an interrupt pending in the interrupt queue from the source device for the destination device.

21 Claims, 7 Drawing Sheets

SYSTEM AND METHOD FOR DELAYING AN INTERRUPT REQUEST UNTIL CORRESPONDING DATA IS PROVIDED TO A DESTINATION DEVICE

BACKGROUND OF THE INVENTION

1. Technical Field

The present invention relates in general to a system and method for forwarding interrupt requests. In particular, the present invention relates to a system and method for receiving interrupt requests from a source device and delaying delivery of the requests to a destination device until the delivery to the destination device of previously received data has been completed.

2. Description of the Related Art

Interrupt requests are a common means of communication between devices in computer systems. An interrupt is sent from a first device to a second device in order for the first device to "get the attention" of the second device before the first device sends instructions and/or data to the second device.

Devices may be connected to each other directly or the devices may be connected to each other through a data bus that connects multiple devices. In some instances, devices exchanging data may be located on two or more different busses; the busses themselves may be connected though a bridge controller. Bridge controllers typically include buffers or queues and are configured to receive and store data from a first device and subsequently send the data to a second device. In high data traffic situations, the bridge may store the data in the buffer and send the data to the destination device on a first-in-first-out basis and/or in response to an availability of the bus(ses) connecting the bridge controller to the destination device.

Interrupt requests typically are routed through direct lines between the devices, even in cases where bridge controllers control the flow of data. In the cases where a bridge (or a similar device) exists, a first device may, for example, transmit data to a second device through a bus or busses and one or more bridges, directly send an interrupt to the second device, and then send instructions (again through the bus or busses and one or more bridges) for the processing of that data. The interrupt may be sent from the first device in order to "get the attention" of the second device and ask the second device to process the data, for example. In many instances, however, the data may be delayed in the bridge and may reach the second device before the forwarding of the data to the second device has been completed. The second device would then receive an interrupt and wait for instructions to process data that the second device has not yet received.

What is needed, therefore, is a system and method that could better manage the delivery of interrupts and data from one device to another. The system and method should provide a way of ensuring the completion of the data delivery to a device prior to sending an interrupt request, whose action depends upon the completion of the data transfer, to the device.

SUMMARY

It has been discovered that the aforementioned challenges can be addressed by a system and method for forwarding interrupts from a source device to a destination device through a bridge controller in response to completing a transfer of previously received data from the source device to the destination device. If the transfer of the data is not complete, the interrupt request is held until the data transfer has been completed. Any additional data received from the source device for the destination device may be rejected until the previously received data have been transferred and the interrupt has been forwarded to the second device.

A bridge controller receives data from a source device for a destination device. The incoming data may be stored in a data queue with other incoming data from other devices served by the bridge controller. Data from the data queue may be transferred to the destination device on a first-in-first-out priority and in response to an availability of a path (such as a bus or busses) from the bridge controller to the destination device. A device ID of the source device and an address of the destination device may be determined and also stored in the data queue.

An interrupt request is then received from the source device for the destination device. The interrupt may be stored in an interrupt queue and forwarded to the destination device in response to the completion of a transfer of the previously received data from the source device and intended for the destination device.

If data received from the source device and intended for the destination device are pending in the data queue, the interrupt request is held in the interrupt queue and is not forwarded to the destination device. If additional data are received from the source device for the destination device, the data may be rejected by the bridge controller if the interrupt request is still pending in the interrupt queue.

Delaying the delivery of the interrupt request from the source device to the destination device ensures that any data from the source device for the destination device (upon which data the interrupt request may depend) are delivered to the destination device before the interrupt request is delivered to the device.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

DETAILED DESCRIPTION

The following is intended to provide a detailed description of an example of the invention and should not be taken to be limiting of the invention itself. Rather, any number of variations may fall within the scope of the invention defined in the claims following the description.

Figure 1:
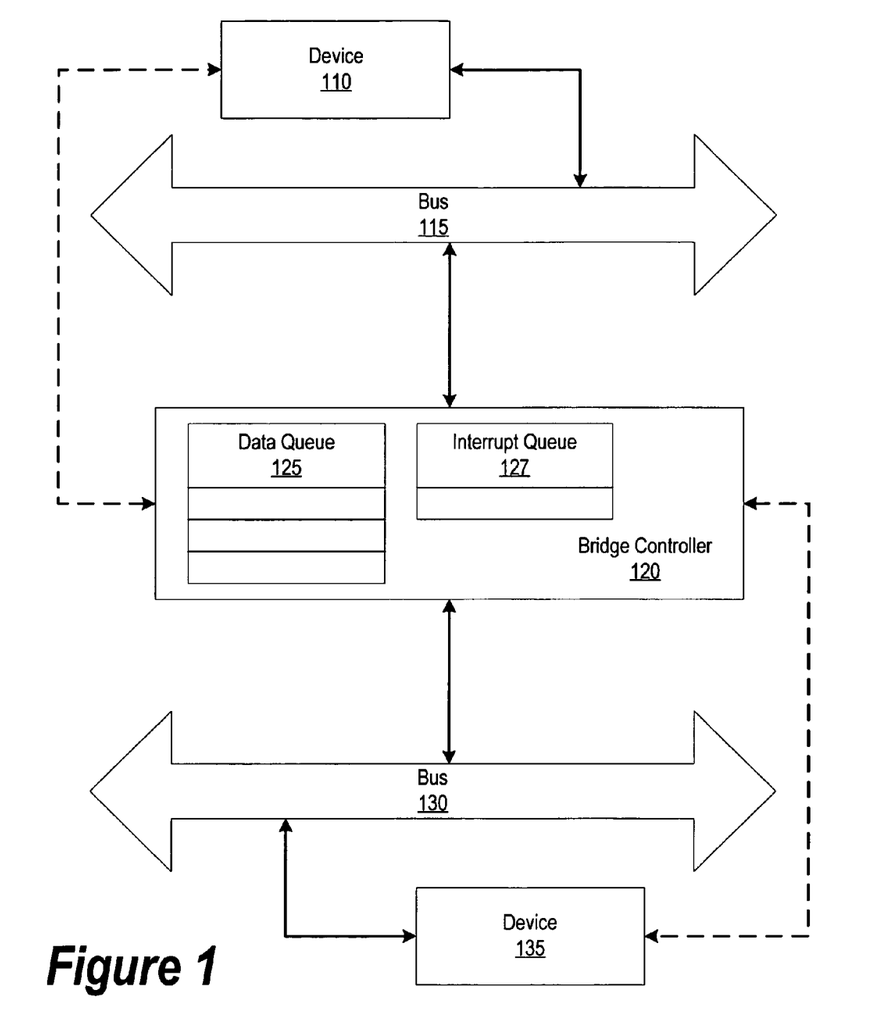
FIG. 1 is a block diagram illustrating a system for forwarding an interrupt request from a source device to a destination device.

FIG. 1 is a block diagram illustrating a system for forwarding an interrupt from a source device to a destination device. Bridge controller 120 is configured to transfer data and interrupt requests between devices connected to the bridge controller. Devices may be connected directly to bridge controller 120 or the devices may be connected to bridge controller 120 through one or more buses and/or one or more additional bridge controllers. For example, as shown in FIG. 1, device 110 transfers data to and from bridge controller 120 through bus 115, and device 135 transfers data to and from bridge controller 120 through bus 130. In addition to the data busses, direct interrupt request lines may exist between device 110 and bridge controller 120 and between device 135 and bridge controller 120 for transferring, through bridge controller 135, interrupt requests to and from device 110 and device 135.

In one embodiment, bridge controller 120 is configured to receive data from a source device and forward the data to a destination device. In addition, bridge controller 120 is configured to receive interrupt requests from a source device and forward the requests to a destination device.

Upon receiving data from a source device, bridge controller 120 is configured to store the data in data queue 125. Data may then be transferred to the destination device on a first-in-first-out priority and in response to the availability of the bus, busses, and/or additional bridge controllers connecting bridge controller 120 to the destination device. In addition, upon receiving an interrupt request, bridge controller 120 is configured to store the interrupt request in interrupt queue 127. In one embodiment, bridge controller 115 is configured to forward the interrupt request to the destination device if there are no data pending from the source device and intended for the destination device in data queue 125.

Figure 2:
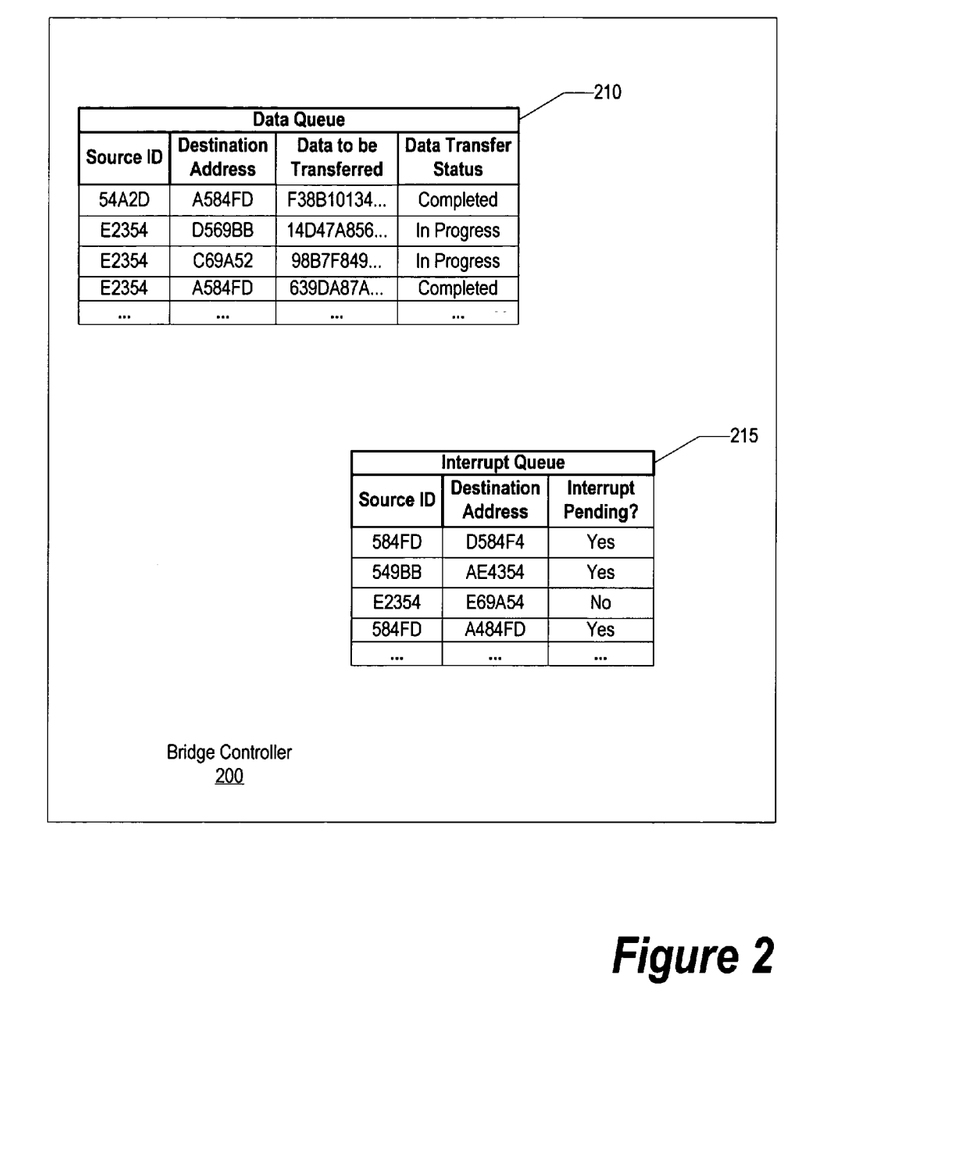
FIG. 2 is a block diagram illustrating a bridge controller having a data queue and an interrupt request queue.

FIG. 2 is a block diagram illustrating bridge controller 220 having a data queue for holding data to be transferred from source devices to destination devices and an interrupt queue for holding interrupt requests to be transferred from source devices to destination devices.

In one embodiment, data queue 210 is configured to hold the data to be transferred as well as the ID of the source device and the address destination device. In addition, data queue 210 may hold a data transfer status, which indicates whether the data transfer has been completed. The data transfer status may be used, for example, to determine whether to forward an interrupt request to a destination device. If there are data from the source device pending to be delivered to the destination device, an incoming interrupt from the source device for the destination device is not forwarded to the destination device.

In one embodiment, interrupt queue 215 is configured to hold the ID of the source device, the address of the destination device, and an interrupt pending status, which indicates whether the interrupt has been delivered to the destination device. The interrupt transfer status may be used, for example, to determine whether to accept more data from a source device. If there is an interrupt pending from a source device for a destination device, for example, the bridge controller may reject additional data transfer requests from the source device until the interrupt request has first been delivered to the destination device.

Figure 3:
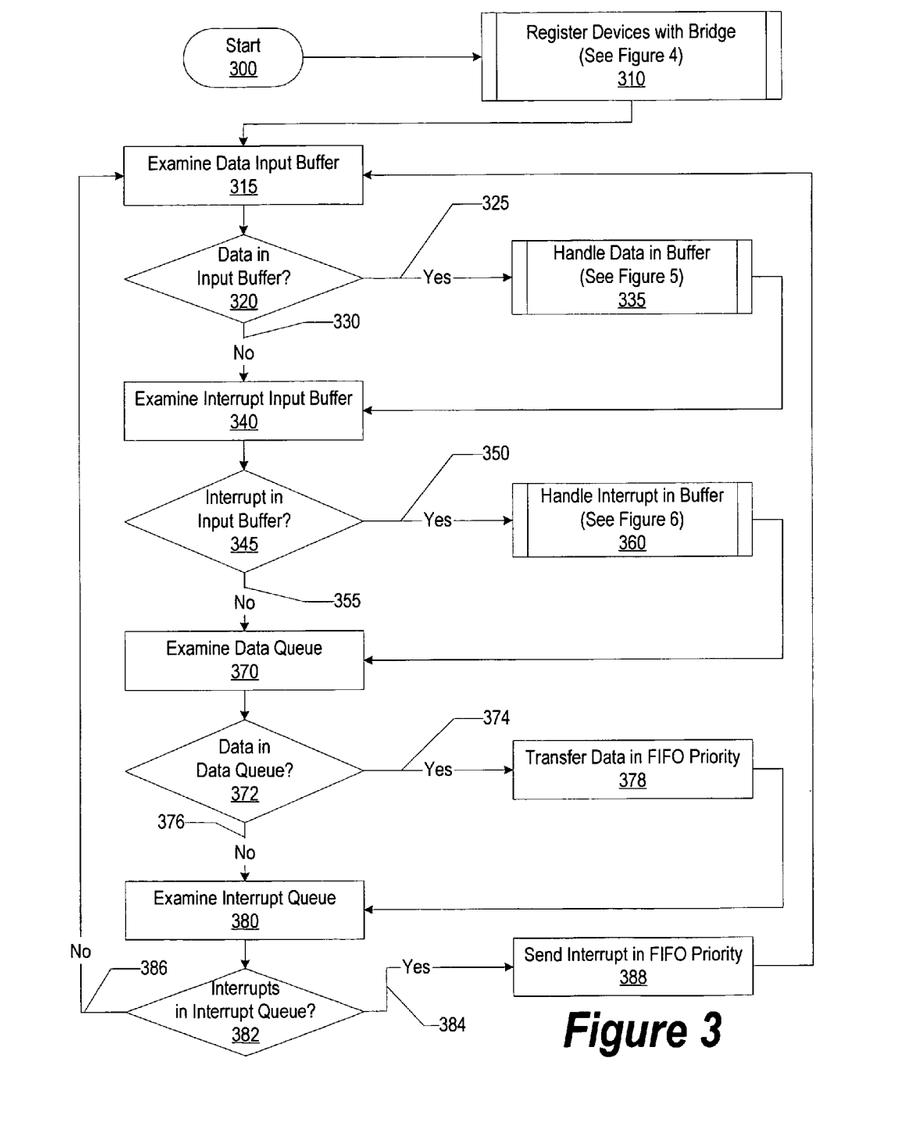
FIG. 3 is a flowchart illustrating a method for forwarding data and interrupt requests from a source device to a destination device.

FIG. 3 is a flowchart illustrating a method for forwarding data and interrupt requests from a source device to a destination device. Processing begins at 300 whereupon, at step 310, the devices that will be exchanging data through the bridge controller are registered with the bridge controller. More details on the processing that takes place at predefined process 310 are provided in the flowchart of FIG. 4 and corresponding text.

After predefined process 310, processing continues at step 315 where the data input buffer is examined to determine whether the input buffer contains data received from a device. A determination is then made as to whether data were found in the data input buffer of the bridge controller at decision 320. If there are data pending in the data input buffer, decision 320 branches to "yes" branch 325 whereupon, at predefined process 335, the received data are handled. More details on the processing that takes place at predefined process 335 are provided in the flowchart in FIG. 5 and accompanying text.

On the other hand, if there are no data in the data input buffer, decision 320 branches to "no" branch 330 bypassing predefined process 335. Processing then continues at step 340 where the interrupt input buffer is examined to determine whether the input buffer contains interrupt requests received from a device. A determination is then made as to whether an interrupt request was found in the interrupt input buffer at decision 345. If no interrupt requests were found in the interrupt input buffer, decision 345 branches to "yes" branch 350 whereupon, at predefined process 360, the received interrupt is handled. More details on the processing that takes place at predefined process 360 are provided in the flowchart in FIG. 6 and corresponding text.

On the other hand, if there are no interrupts pending in the interrupt input buffer, decision 345 branches to "no" branch 355 bypassing step 360. Processing then continues at step 370 where the data queue is examined for data pending in the data queue to be transferred to destination devices. A determination is then made as to whether pending data were found in the data queue at decision 372. If there are data pending in the data queue, decision 372 branches to "yes" branch 374 whereupon, at step 378, data are transferred from the data queue to the appropriate destination device in a first-in-first-out priority. The order of the data transfer may also depend on the availability of a path (such as busses and/or other bridges) between the bridge controller and the destination device.

On the other hand, if there are no data pending in the data queue, decision 372 branches to "no" branch 376 bypassing step 378. At step 380, the interrupt queue is examined to determine whether interrupt requests are pending for delivery to destination devices in the interrupt queue of the bridge controller. A determination is then made as to whether pending interrupts were found in the interrupt queue at decision 382. If there are pending interrupts, decision 382 branches to "yes" branch 384 whereupon, at step 388, the interrupts in the interrupt queue are delivered to the appropriate destination devices at step 388.

On the other hand, if there are no interrupts pending in the interrupt queue, decision 382 branches to "no" branch 386 bypassing step 388. Processing subsequently loops back to step 315 where the input buffers and data queues continue to be examined for data. The looping continues until the bridge controller is turned off or otherwise the bridge controller's operation is suspended.

Figure 4:
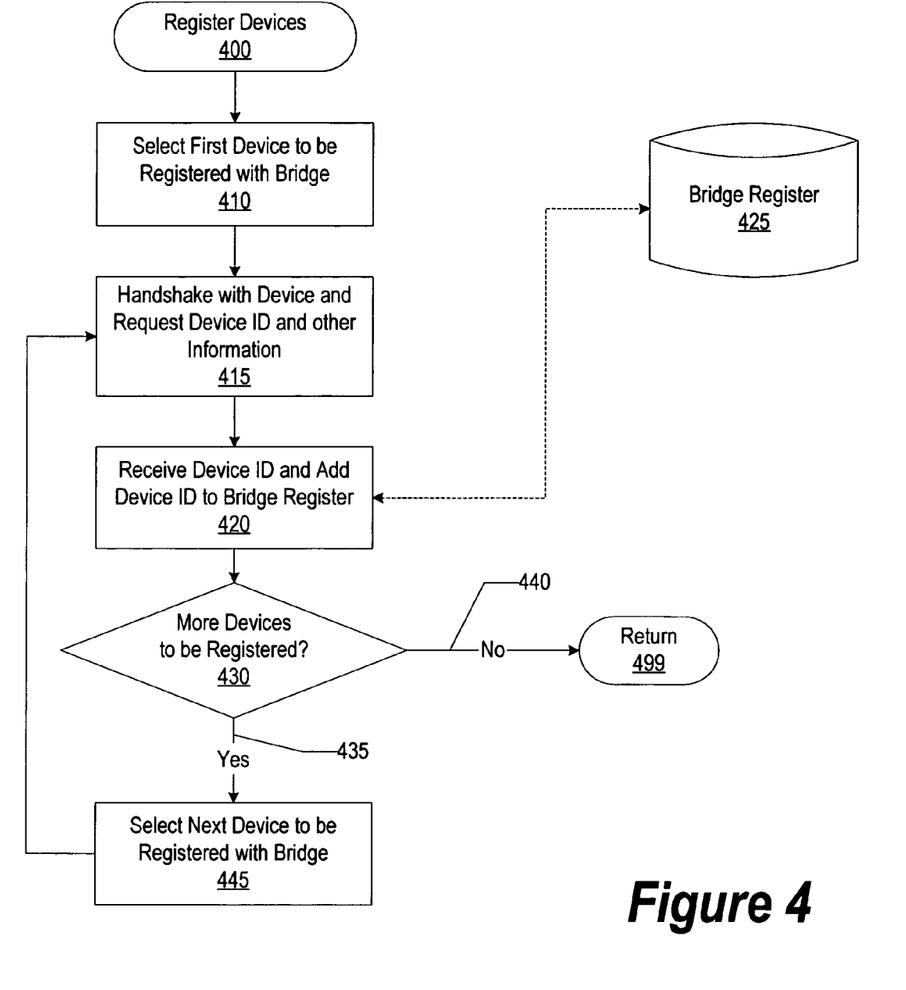
FIG. 4 is a flowchart illustrating a method for registering devices with a bridge controller for the purpose of transferring data between the devices through the bridge controller.

FIG. 4 is a flowchart illustrating a method for registering devices with a bridge controller for the purpose of transferring data between the devices through the bridge controller. Processing begins at 400 whereupon, at step 410, the first device to be registered with the bridge controller is selected. At step 415, the bridge controller performs a handshake with the selected device in order to request and receive the selected device's ID and potentially other related data, such as communication protocols, data transfer limitations, buffer sizes, or any other parameters required to facilitate future communication between the bridge controller and the selected device.

At step 420, the device's ID is received and the ID is added to bridge register 425. A determination is then made as to whether more devices remain to be registered at decision 430. If there are more devices remaining to be registered with the bridge controller, decision 430 branches to "yes" branch 435 whereupon, at step 445, the next device to be registered with the bridge is selected. Processing then loops back to step 415 for the newly selected device to be registered. This looping continues until there are no more devices to be registered, at which time, decision 430 branches to "no" branch 440 whereupon processing returns to the calling routine at 499.

Figure 5:
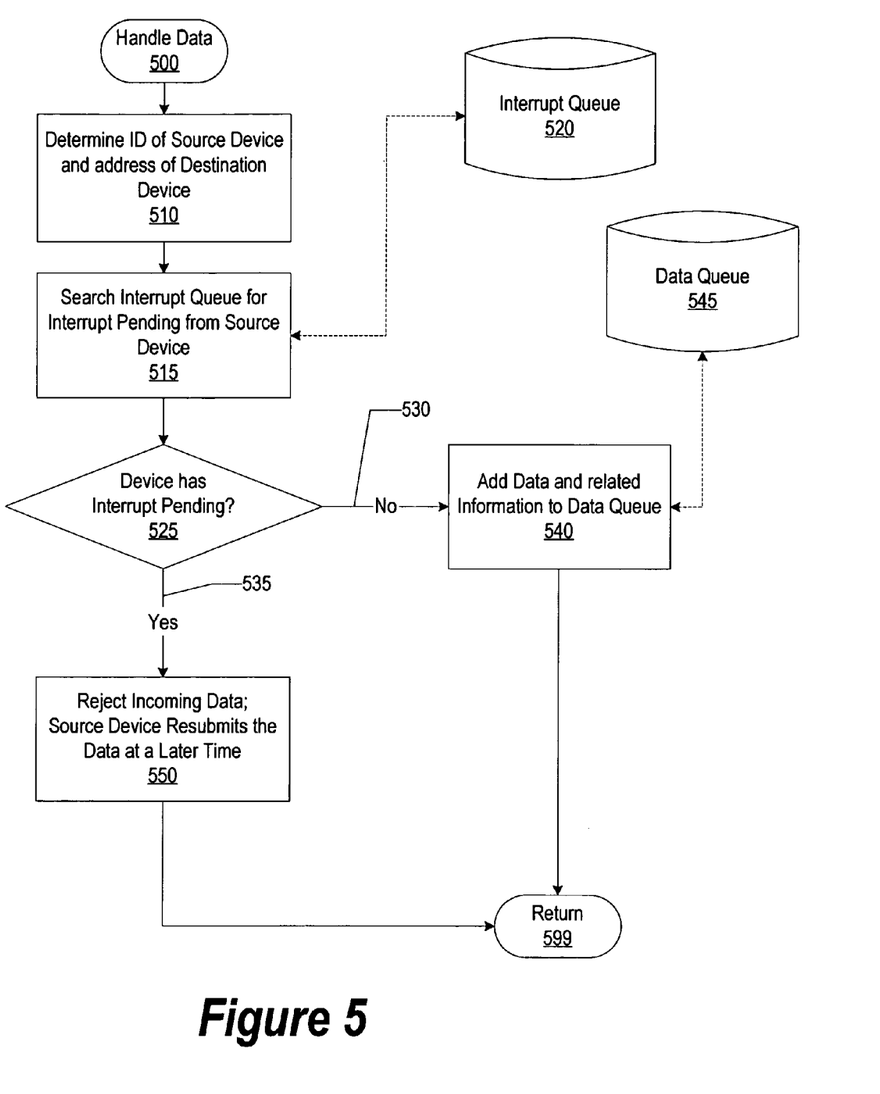
FIG. 5 is a flowchart illustrating a method for handling incoming data from a source device.

FIG. 5 is a flowchart illustrating a method for handling incoming data from a source device. Processing begins at 500 whereupon, at step 510, the ID of the source device and the address of the destination device are determined. In one embodiment, the source ID and the destination address are included in the data received from the source device.

At step 515, interrupt queue 520 is searched in order to determine whether there is an interrupt pending from the source device to the destination device. In another embodiment, interrupt queue 520 may be searched in order to determine whether the source device has an interrupt pending for any device. In one embodiment, interrupt requests are stored in interrupt queue 520 as the interrupt requests are received from the devices connected to the bridge controller. An interrupt request is removed from the queue (or marked as not pending) after the interrupt request has been forwarded to the appropriate destination device.

A determination is then made as to whether a pending interrupt from the source device intended for the destination device was found at decision 525. If no pending interrupt was found, decision 525 branches to "no" branch 530 whereupon, at step 540, the received data are added to data queue 545. In one embodiment, data are transferred to the appropriate destination devices on a first-in-first-out priority (FIFO). The priority of the transfers may also be dependent on the data traffic existing on a connection path (such as a bus) leading to the destination device from the bridge controller. Processing subsequently returns to the calling routine at 599.

Returning to decision 525, if a pending interrupt was found in the interrupt queue, decision 525 branches to "yes" branch 535 whereupon, at step 550, the incoming data are rejected and are not added to data queue 545. A pending interrupt request implies the existence of pending older data that must first be delivered to the destination device before the new data (whose processing most likely depends on the processing of the old data) can be delivered. The source device may at this point re-submit the data at a later time, in which case, the same test is performed (that is, it is determined whether there is an interrupt pending, and depending on whether an interrupt is pending or not, the data is handled accordingly).

Processing subsequently returns to the calling routine at 599.

Figure 6:
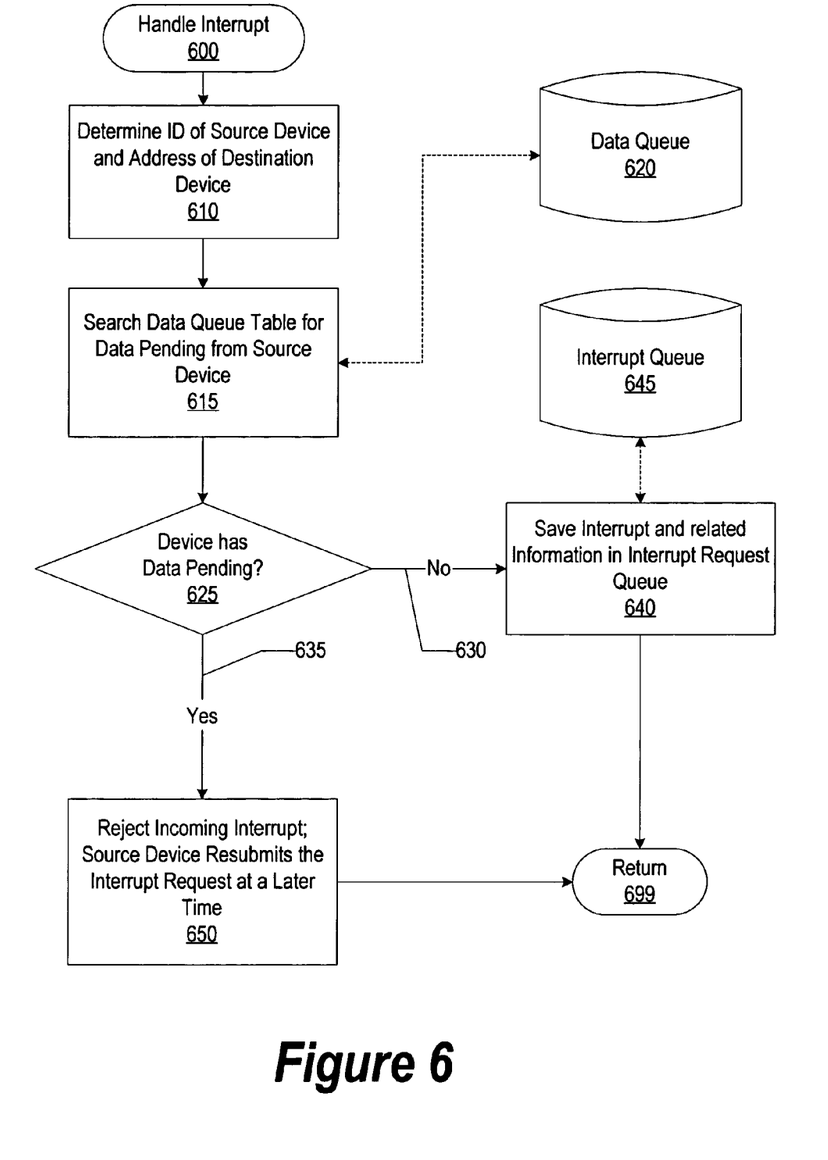
FIG. 6 is a flowchart illustrating a method for handling incoming interrupt requests from a source device.

FIG. 6 is a flowchart illustrating a method for handling incoming interrupt requests from a source device. Processing begins at 600 whereupon, at step 610, the ID of the source device and the address of the destination device are determined. The ID of the source device and the address of the destination device may be included, for example, in the interrupt request received by the bridge controller.

Processing subsequently continues at step 615 where data queue 620 is searched in order to determine whether there exist pending data in the data queue from the source device intended for the destination device. In another embodiment, data queue 620 may be searched in order to determine whether the source device has data pending for any device. A determination is then made as to whether pending data were found at decision 625. If there are no pending data, decision 625 branches to "no" branch 630 whereupon, at step 640, the interrupt request and related information is added to interrupt request queue 645. In one embodiment, the interrupt requests are forwarded to the appropriate destination devices on a first-in-first-out priority. Processing subsequently returns to the calling routine at 699.

If, on the other hand, pending data were found in the data queue, decision 625 branches to "yes" branch 635 whereupon, at step 650, the interrupt request is rejected. At this time, the source device may resubmit the interrupt request at a later time. Processing subsequently returns to the calling routine at 699.

Figure 7:
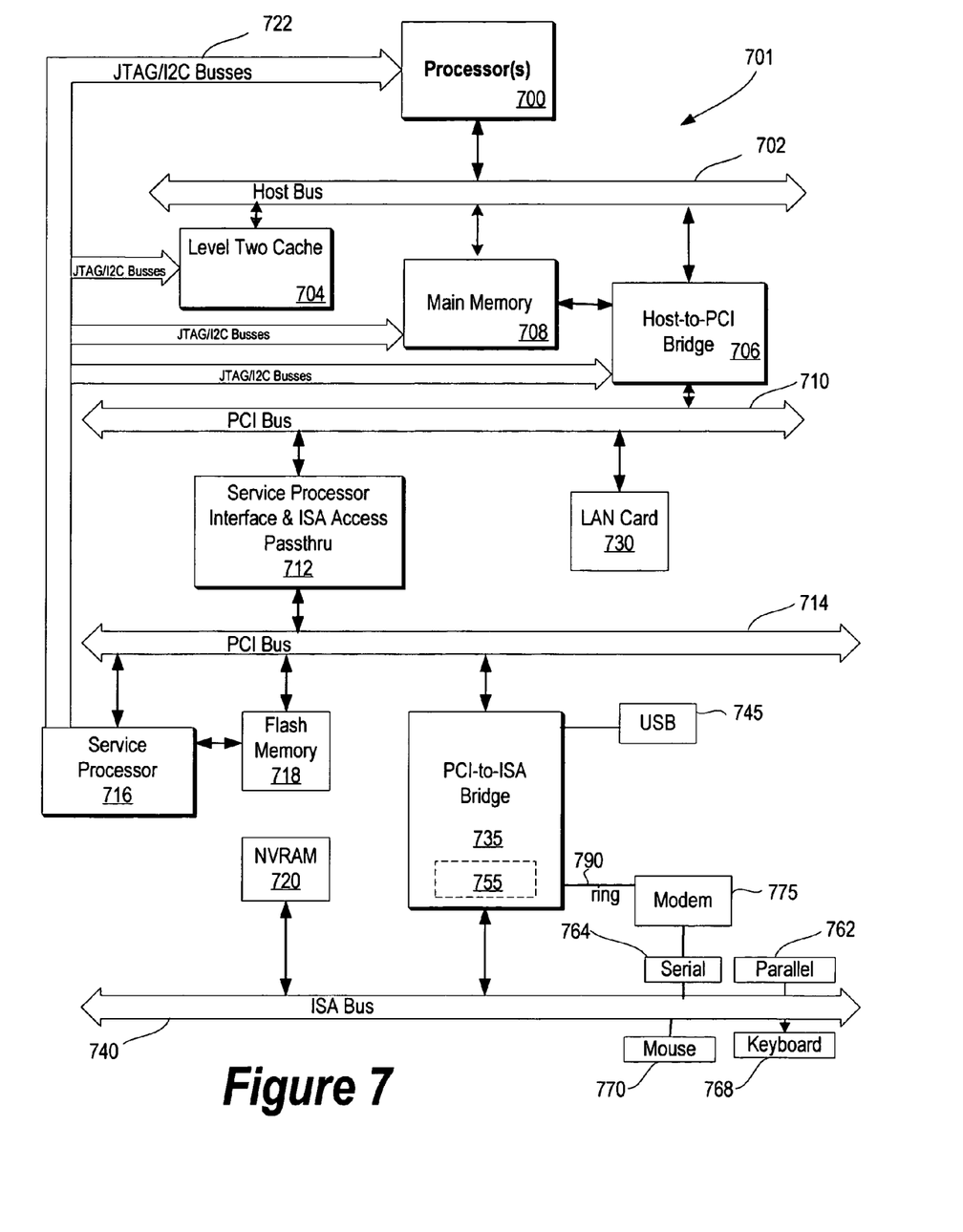
FIG. 7 illustrates an information handling system that is a simplified example of a computer system capable of performing the operations described herein.

FIG. 7 illustrates information handling system 701 which is a simplified example of a computer system capable of performing the computing operations described herein. Computer system 701 includes processor 700 which is coupled to host bus 702. A level two (L2) cache memory 704 is also coupled to host bus 702. Host-to-PCI bridge 706 is coupled to main memory 708, includes cache memory and main memory control functions, and provides bus control to handle transfers among PCI bus 710, processor 700, L2 cache 704, main memory 708, and host bus 702. Main memory 708 is coupled to Host-to-PCI bridge 706 as well as host bus 702. Devices used solely by host processor(s) 700, such as LAN card 730, are coupled to PCI bus 710. Service Processor Interface and ISA Access Pass-through 712 provides an interface between PCI bus 710 and PCI bus 714. In this manner, PCI bus 714 is insulated from PCI bus 710. Devices, such as flash memory 718, are coupled to PCI bus 714. In one implementation, flash memory 718 includes BIOS code that incorporates the necessary processor executable code for a variety of low-level system functions and system boot functions.

PCI bus 714 provides an interface for a variety of devices that are shared by host processor(s) 700 and Service Processor 716 including, for example, flash memory 718. PCI-to-ISA bridge 735 provides bus control to handle transfers between PCI bus 714 and ISA bus 740, universal serial bus (USB) functionality 745, power management functionality 755, and can include other functional elements not shown, such as a real-time clock (RTC), DMA control, interrupt support, and system management bus support. Nonvolatile RAM 720 is attached to ISA Bus 740. Service Processor 716 includes JTAG and I2C busses 722 for communication with processor(s) 700 during initialization steps. JTAG/I2C busses 722 are also coupled to L2 cache 704, Host-to-PCI bridge 706, and main memory 708 providing a communications path between the processor, the Service Processor, the L2 cache, the Host-to-PCI bridge, and the main memory. Service Processor 716 also has access to system power resources for powering down information handling device 701.

Peripheral devices and input/output (I/O) devices can be attached to various interfaces (e.g., parallel interface 762, serial interface 764, keyboard interface 768, and mouse interface 770 coupled to ISA bus 740. Alternatively, many I/O devices can be accommodated by a super I/O controller (not shown) attached to ISA bus 740.

In order to attach computer system 701 to another computer system to copy files over a network, LAN card 730 is coupled to PCI bus 710. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the processes described herein, this computer system is simply one example of a computer system. Those skilled in the art will appreciate that many other computer system designs are capable of performing the processes described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method comprising:
    receiving data at a bridge controller from a source device for a destination device;
    receiving an interrupt request at the bridge controller from the source device for the destination device, the interrupt request corresponding to the received data;
    transferring the data from the bridge controller to the destination device; and
    in response to completing the transferring of the data, forwarding the received interrupt request from the bridge controller to the destination device.

2. The method of claim 1, further comprising storing the data in a data queue after the receiving the data.

3. The method of claim 2, further comprising determining and storing in the data queue a device ID of the source device and an address of the destination device.

4. The method of claim 2, further comprising transferring the data from the data queue to the destination device in a first-in-first-out priority and in response to a path to the destination device being available.

5. The method of claim 1, further comprising storing the interrupt request in an interrupt queue after the receiving the interrupt request.

6. The method of claim 5, further comprising determining and storing in the interrupt queue a device ID of the source device and an address of the destination device.

7. The method of claim 5, further comprising transferring the interrupt from the interrupt queue to the destination device in a first-in-first-out priority.

8. An apparatus comprising:
    a control unit adapted to;
    receive data at the control unit from a source device for a destination device;
    receive an interrupt request at the control unit from the source device for the destination device, the interrupt request corresponding to the received data;
    transfer the data from the control unit to the destination device; and
    in response to completing the transfer of the data, forward the received interrupt request from the control unit to the destination device.

9. The apparatus of claim 8, the control unit further adapted to store the data in a data queue after receiving the data.

10. The apparatus of claim 9, the control unit further adapted to determine and store in the data queue a device ID of the source device and an address of the destination device.

11. The apparatus of claim 9, the control unit further adapted to transfer the data from the data queue to the destination device in a first-in-first-out priority and in response to a path to the destination device being available.

12. The apparatus of claim 8, the control unit further adapted to store the interrupt request in an interrupt queue after receiving the interrupt request.

13. The apparatus of claim 12, the control unit further adapted to determine and store in the interrupt queue a device ID of the source device and an address of the destination device.

14. The apparatus of claim 12, the control unit further adapted to transfer the interrupts from the interrupt queue to the destination device in a first-in-first-out priority.

15. A computer program product stored on a computer operable media, the computer program product comprising software code effective to:

receive data from a source device for a destination device;

receive an interrupt request from the source device for the destination device, the interrupt request corresponding to the received data;

transfer the data from the bridge controller to the destination device; and in response to completing the transfer of the data, forward the received interrupt request to the destination device.

16. The computer program product of claim 15, the software code further effective to store the data in a data queue after receiving the data.

17. The computer program product of claim 16, the software code further effective to determine and store in the data queue a device ID of the source device and an address of the destination device.

18. The computer program product of claim 16, the software code further effective to transfer the data from the data queue to the destination device in a first-in-first-out priority and in response to a path to the destination device being available.

19. The computer program product of claim 15, the software code further effective to store the interrupt request in an interrupt queue after receiving the interrupt request.

20. The computer program product of claim 19, the software code further effective to determine and store in the interrupt queue a device ID of the source device and an address of the destination device.

21. The computer program product of claim 19, the software code further effective to transfer the interrupt requests from the interrupt queue to the destination device in a first-in-first-out priority.

* * * * *